United States Patent
Zhang et al.

(10) Patent No.: US 11,535,241 B2
(45) Date of Patent: Dec. 27, 2022

(54) VEHICLE POWERTRAIN CONTROL SYSTEM

(71) Applicant: FORD GLOBAL TECHNOLOGIES, LLC, Dearborn, MI (US)

(72) Inventors: Yijing Zhang, Canton, MI (US); Yuji Fujii, Ann Arbor, MI (US); Jason Meyer, Canton, MI (US); Akshay Bichkar, Ann Arbor, MI (US); Hirai Jayantilal Haria, Ypsilanti, MI (US); Huanyi Shui, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 17/212,470

(22) Filed: Mar. 25, 2021

(65) Prior Publication Data
US 2022/0306080 A1 Sep. 29, 2022

(51) Int. Cl.
*B60W 20/40* (2016.01)
*B60W 10/02* (2006.01)
*B60W 10/06* (2006.01)

(52) U.S. Cl.
CPC ......... *B60W 20/40* (2013.01); *B60W 10/02* (2013.01); *B60W 10/06* (2013.01); *B60W 2510/0275* (2013.01)

(58) Field of Classification Search
CPC ...... B60W 20/40; B60W 10/02; B60W 10/06; B60W 2510/0275; F16H 61/0403; F16H 61/6645
See application file for complete search history.

(56) References Cited

U.S. PATENT DOCUMENTS

| | | | |
|---|---|---|---|
| 5,742,917 A | 4/1998 | Matsuno | |
| 6,154,702 A | 11/2000 | Fodor et al. | |
| 6,640,178 B2 | 10/2003 | Wakamatsu et al. | |
| 7,203,578 B2 | 4/2007 | Kuang et al. | |
| 7,920,950 B2 | 4/2011 | Nihanda | |
| 8,998,771 B2 | 4/2015 | Pietron et al. | |
| 9,258,284 B2 | 2/2016 | Tanaka | |
| 9,423,022 B2 | 8/2016 | Turner et al. | |
| 9,512,889 B2 | 12/2016 | Pietron et al. | |
| 9,551,415 B2 | 1/2017 | Fodor et al. | |
| 10,571,022 B2 | 2/2020 | Meyer et al. | |
| 11,209,054 B1 | 12/2021 | Zhang et al. | |
| 2010/0222961 A1 | 9/2010 | Dlugoss | |

(Continued)

*Primary Examiner* — George C Jin
(74) *Attorney, Agent, or Firm* — Vincent Mastrogiacomo; Brooks Kushman P.C.

(57) ABSTRACT

A vehicle includes a transmission, an engine, a clutch, and a controller. The transmission has an input. The engine is configured to generate and deliver torque to the input. The clutch is configured to connect and disconnect the engine from the input, and to crank the engine during an engine start. The controller is programmed to, in response to a command to adjust a torque of the clutch during an engine start and a presence of first condition of the clutch, drive a clutch actuator pressure to a first desired value based on a first transfer function. The controller is further programmed to, in response to a command to adjust the torque of the clutch during the engine start and a presence of a second condition of the clutch, drive the clutch actuator pressure to a second desired value based on a second transfer function.

20 Claims, 5 Drawing Sheets

(56) References Cited

U.S. PATENT DOCUMENTS

| | | | |
|---|---|---|---|
| 2013/0153353 A1* | 6/2013 | Teslak | F16H 61/04 |
| | | | 192/48.1 |
| 2014/0195082 A1 | 7/2014 | Takamura et al. | |
| 2014/0342869 A1 | 11/2014 | Maurer et al. | |
| 2015/0066264 A1* | 3/2015 | Wang | B60W 10/08 |
| | | | 903/902 |
| 2015/0274146 A1* | 10/2015 | Doering | B60W 10/02 |
| | | | 477/79 |
| 2016/0031431 A1 | 2/2016 | Johri et al. | |
| 2016/0159352 A1 | 6/2016 | Kim et al. | |
| 2018/0245692 A1 | 8/2018 | Meyer et al. | |
| 2018/0251118 A1 | 9/2018 | Gaither | |
| 2019/0176798 A1 | 6/2019 | Ford et al. | |
| 2019/0283766 A1 | 9/2019 | Jensen et al. | |
| 2020/0202057 A1 | 6/2020 | Chen et al. | |

\* cited by examiner large">VEHICLE POWERTRAIN CONTROL SYSTEM

TECHNICAL FIELD

The present disclosure relates to control systems for vehicles and vehicle powertrains.

BACKGROUND

Vehicles may include power generating devices, such as an engine or an electric motor, that are configured to generate torque within a powertrain of the vehicle in order to propel the vehicle.

SUMMARY

A vehicle includes a transmission, an engine, an electric machine, a disconnect clutch, an inertial measurement unit, and a controller. The transmission has an input and an output. The engine is configured to generate and deliver torque to the input. The electric machine is configured to generate and deliver torque to the input. The disconnect clutch is configured to connect and disconnect the engine from the input, and to crank the engine during an engine start. The inertial measurement unit is configured to measure inertial forces exerted onto the vehicle. The controller is programmed to, in response to a demanded torque at the output, control the torque at the output based on a mapped relationship from the inertial forces and a vehicle velocity. The controller is further programmed to, in response to a command to start the engine via the disconnect clutch and a first slipping condition of the disconnect clutch, close the disconnect clutch, calculate the torque of the disconnect clutch based on the controlled torque at the output and an electric machine torque, and map the relationship between the torque of the disconnect clutch and a clutch actuator pressure to derive or adjust a first transfer function that represents the relationship between the torque of the disconnect clutch and the clutch actuator pressure under the first slipping condition. The controller is further programmed to, in response to a command to adjust the torque of the disconnect clutch to a first desired value during a first engine start and the first slipping condition of the disconnect clutch, adjust the clutch actuator pressure to a first value that corresponds to the first desired value according to the first transfer function.

A vehicle includes a transmission, an engine, a clutch, and a controller. The transmission has an input. The engine is configured to generate and deliver torque to the input. The clutch is configured to connect and disconnect the engine from the input, and to crank the engine during an engine start. The controller is programmed to, in response to a command to adjust a torque of the clutch during an engine start and a presence of a hydrodynamic lubrication condition of the clutch, drive a clutch actuator pressure to a first desired value. The controller is further programmed to, in response to a command to adjust the torque of the clutch during the engine start and a presence of a boundary lubrication condition of the clutch, drive the clutch actuator pressure to a second desired value that is greater than the first desired value.

A vehicle includes a powertrain and a controller. The powertrain includes a transmission, an engine, a disconnect clutch, and a controller. The transmission has an input shaft and an output shaft. The engine is configured to generate and deliver torque to the input shaft. The disconnect clutch is configured to connect and disconnect the engine from the input shaft, and to crank the engine during an engine start. The controller is programmed to, in response to a command to start the engine via the disconnect clutch and a first condition of the powertrain, close the disconnect clutch, calculate the torque of the disconnect clutch based on a controlled torque at the output shaft, and map the relationship between the torque of the disconnect clutch and a clutch actuator pressure to adjust a first transfer function that represents the relationship between the torque of the disconnect clutch and the clutch actuator pressure. The controller is further programmed to, in response to a command to control the torque of the disconnect clutch during a first engine start and the first condition, adjust the clutch actuator pressure according to the first transfer function to control the torque of the disconnect clutch.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
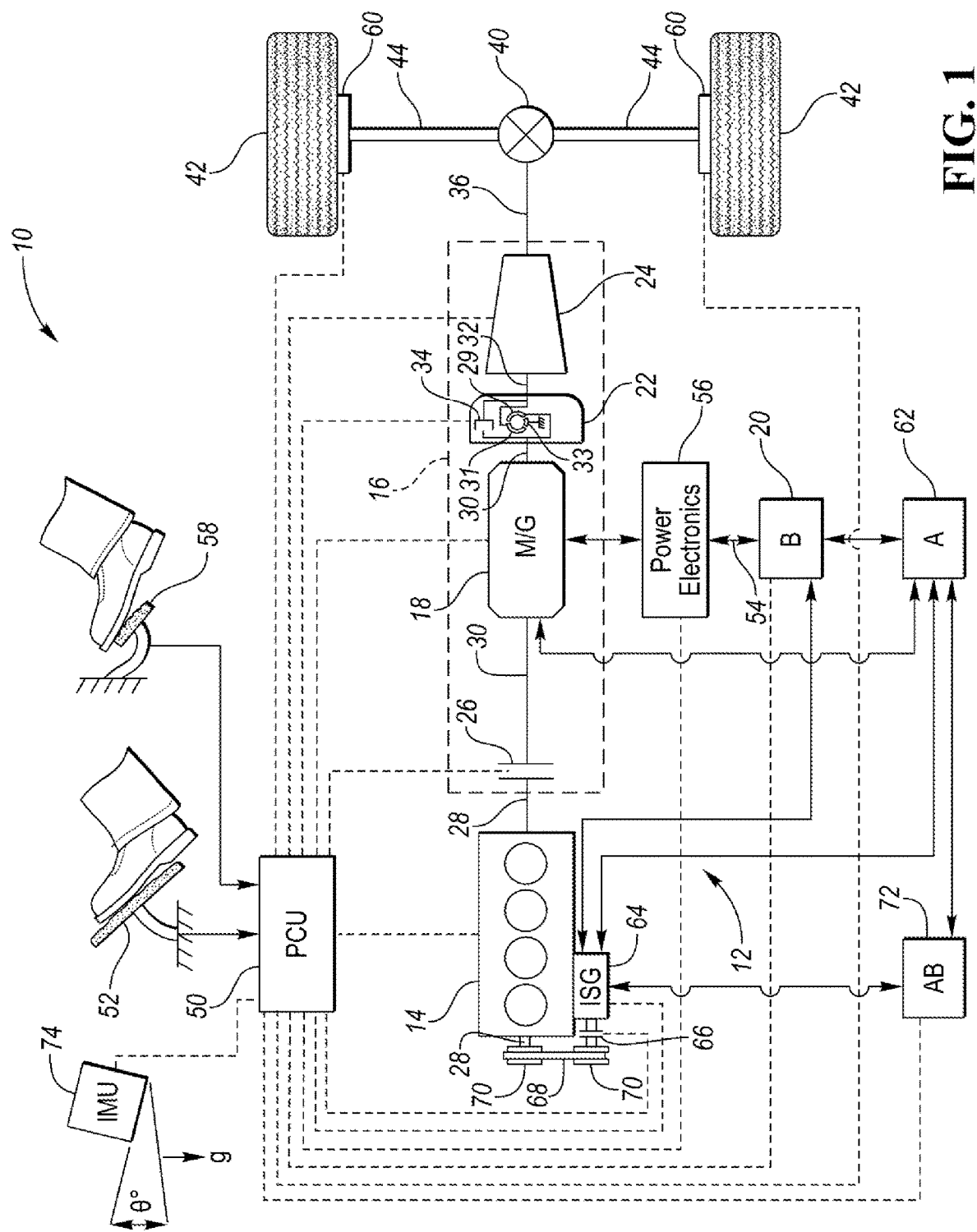
FIG. 1 is a schematic illustration of a representative powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The powertrain 12 includes power generating components (i.e., engines or electric motors) and the drivetrain. The drivetrain is the group of components that deliver power to the driving wheels, excluding the power generating components. In contrast, the powertrain 12 is considered to include both the power generating components and the drivetrain.

The engine 14 and the M/G 18 are both drive sources or powerplants for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller 29 fixed to M/G shaft 30, a turbine 31 fixed to a transmission input shaft 32, and a stator 33 that is grounded such that it does not rotate. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be configured to transition between an opened (or disconnected) state, a closed (or locked) state, and a slipping state. The rotation of the impeller 29 and the turbine 31 are synchronized when the torque converter bypass clutch 34 is in the closed or locked state. The rotation of the impeller 29 and the turbine 31 are non-synchronized when the torque converter bypass clutch 34 is in the opened state or the slipping state.

The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. In another alternative embodiment, the M/G 18 may be disposed between the gearbox 24 and the differential 40. In such an alternative embodiment, where the M/G 18 is disposed between the gearbox 24 and the differential, one or more launch clutches or a torque converter may be disposed between the engine and the gearbox 24.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), randomaccess memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example. A pressure transducer may be utilized to measure a hydraulic pressure applied to a hydraulic actuator of the disconnect clutch 26.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine power and/or torque through the disconnect clutch 26 to the M/G 18, and then from the M/G 18 to shaft 30 (i.e., the impeller of the torque converter 22) and through the torque converter 22 and gearbox 24. The M/G 18 may assist the engine 14 by providing additional power and/or torque to turn the shaft 30 (i.e., the impeller of the torque converter 22). This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative power and/or torque to the shaft 30 (i.e., the impeller of the torque converter 22). This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an opened state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

The vehicle 10 also includes an inertial measurement unit 74. The inertial measurement unit 74 is an electronic device that measures the vehicle's specific force, inertial forces acting upon the vehicle, angular rate of the vehicle, orientation of the vehicle, acceleration of the vehicle in multiple directions, attitude of the vehicle, pitch of the vehicle, etc., using a combination of accelerometers, gyroscopes, magnetometers and/or other sensors. The inertial measurement unit 74 may utilize such sensors along multiple axes to provide an estimation of the vehicle's orientation in space. The various measurements taken by the inertial measurement unit 74 may be communicated to the controller 50.

It should also be understood that the vehicle configuration described herein is merely exemplary and is not intended to be limited. Other non-hybrid, electric, or hybrid vehicle configurations should be construed as disclosed herein. Other vehicle configurations may include, but are not limited to, vehicles powered by an engine only, micro-hybrid vehicles (i.e., powered by an engine only that has a start/stop function), series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

A wet clutch, which may be controlled by a hydraulic actuator such as a hydraulic piston, may be utilized in automotive propulsion systems for various functions such as automatic shifting of a transmission, disconnecting an engine from the drivetrain, and starting the engine. A mathematical relationship between pressure of the hydraulic actuator and the torque of the wet clutch may be referred to as clutch transfer function. Such a transfer function may be utilized to control the clutch torque. A linear approximation of such a transfer function may be utilized by a vehicle propulsion system to control automatic shifting within the vehicle transmission and/or to control a clutch-based engine start. Wet clutch behavior and a corresponding transfer function that is utilized to control the clutch may be sensitive to engagement conditions. Wet clutch transfer functions that are observed during testing of a clutch on a test stand may differ from the transfer functions observed while operating the same clutch in a vehicle equipped with non-production instrumentation for studying the torque of the clutch.

A wet clutch transfer function behaves linearly under certain conditions, but not under all conditions, making the use of linear approximation acceptable under such certain conditions. A wet clutch transfer function becomes non-linear under other certain conditions, making the use of linear approximation inaccurate and less desirable for robust clutch control under such other certain conditions. Also, a clutch transfer function may vary over a life of a vehicle and may vary from vehicle to vehicle. The use of an inaccurate transfer function may affect clutch control robustness and drivability. Identification and construction of an accurate wet clutch transfer function in a production vehicle may be difficult because it requires an accurate determination of clutch torque at the time of clutch engagement without a specialized torque sensing device.

It is desirable to develop a method to adaptively identify a wet clutch transfer function in a vehicle that applies under all clutch slip conditions, such as hydrodynamic lubrication, mixed lubrication, and boundary lubrication, at the time of clutch engagement without requiring a specialized torque sensing device. In hydrodynamic lubrication, clutch interface is fully lubricated with transmission fluid with no physical contact in-between. The clutch torque is hydrodynamically carried by fluid shearing between rotating clutch plates. In mixed lubrication, the clutch plates establish a limited physical contact at their surface asperities, while partially retaining fluid layer in-between. The clutch torque is carried by both viscous shear and mechanical friction between rotating clutch plates. In boundary lubrication, the transmission fluid is squeezed out from the interface between clutch plates. The clutch torque is entirely carried by mechanical friction between rotating clutch plates. The method described herein adaptively identifies and constructs a clutch transfer function based on the use of an IMU signal, $a_{imu}$, without a specialized torque sensing device. Such an IMU signal, $a_{imu}$, is described in U.S. patent application Ser. No. 16/928,707, filed on Jul. 14, 2020, which is incorporated by reference herein in its entirety.

The control system described herein is utilized to adaptively identify and construct multiple transfer functions for controlling the disconnect clutch 26 to start the engine 14. Specifically, the control system identifies the operating conditions of the powertrain 12, or more specifically the operating conditions of the engine 14 or disconnect clutch 26, prior to engagement of the disconnect clutch 26. Based on what set of conditions is present, the specific transfer function is selected to control the disconnect clutch 26 to start the engine 14. Each specific transfer function may be further adapted by the data (e.g., the torque of the clutch vs. the actuator pressure) that is observed during each engagement of the disconnect clutch 26 to start the engine 14 when the specific transfer function is utilized. The method described herein includes a mathematical equation to calculate the torque of an engine disconnect clutch (e.g., disconnect clutch 26) during an engine start or restart control based on the use of the IMU signal, $a_{imu}$.

The operating conditions of the disconnect clutch 26 prior to engagement of the disconnect clutch 26 are utilized to determine which transfer function is going to be utilized to control the disconnect clutch 26 to start the engine 14. More specifically, the transfer functions may be differentiated by a slipping condition $SC_j$ (j=1, 2, ...) of the disconnect clutch 26 prior to engagement of the disconnect clutch 26 to start the engine 14. The slipping conditions of the disconnect clutch 26 may correspond to a hydrodynamic lubrication condition, a boundary lubrication condition, or a mixed lubrication condition. The slipping condition of the disconnect clutch 26 may be derived or inferred from (1) a period of time or time duration that the disconnect clutch 26 was in a slipping state upon receiving a command to start the engine 14 after a previous engine shutdown (e.g., a time period the disconnect clutch 26 had a slip speed that was above a non-zero threshold value after the previous engine shutdown), (2) a period of time or time duration that the engine 14 was shut down upon receiving a command to start the engine 14 after a previous engine shutdown, (3) a period of time or time duration that the engine 14 was in a zero-speed or near zero speed state (e.g., 10 rpms or less) upon receiving a command to start the engine 14 after a previous engine shutdown, or (4) a period of time or time duration that the speed of the engine 14 was below a threshold value upon receiving a command to start the engine 14 after a previous engine shutdown.

For each transfer function, the engine disconnect clutch torque $T_{K0}(i)$ is calculated at a desired time interval, where i denotes a time step. The engine disconnect clutch torque $T_{K0}(i)$ is mapped against the disconnect clutch actuator pressure $P_{K0}(i)$ to form a transfer function data set $\{T_{K0}(i), P_{K0}(i), i=1, 2, \ldots, n\}$ for each engine restart event. The disconnect clutch actuator pressure $P_{K0}(i)$ may be measured or estimated. The data sets for each transfer function are binned or assigned to the slipping condition $SC_j$ (j=1, 2, ...) of the disconnect clutch 26 prior to engagement of the disconnect clutch 26 to start the engine 14. The data set for each transfer function may be derived by, adjusted via new data by, and stored with the controller 50 or in cloud computing storage. A mathematical regression may be performed to determine each transfer function equation for each slipping condition $SC_j$ (j=1, 2, ...) of the disconnect clutch 26 prior to engagement of the disconnect clutch 26 to start the engine 14.

The transfer function equations may be linear or non-linear. The transfer function equations may mathematically include or may not include a hysteresis loop (e.g., the torque values may be higher to corresponding actuator pressure values when the disconnect clutch 26 is disengaging relative to the when the disconnect clutch 26 is engaging). Mathematical regression may be used to determine the transfer function equations, which may be conducted by the controller 50 or in cloud computing storage. The mathematical regression utilized to determine the transfer function equations may be conducted in a recursive manner or in a batch mode. In a batch mode, a regression method is applied to a collection of transfer function data sets in each transfer function to fit a linear or a nonlinear function. In a recursive mode, a method such as recursive least square method or Kalman filtering is applied to update constants in the regression equation when a new transfer function data set becomes available. The transfer function equations disclosed herein may be used in powertrain control and diagnosis. Such a method for determining linear and non-linear transfer functions of engine disconnect clutch torque relative the disconnect clutch actuator pressure, is described in U.S. patent application Ser. No. 16/928,715, filed on Jul. 14, 2020, which is incorporated by reference herein in its entirety. Furthermore, the transfer functions may be derived more specifically, via a non-parametric model, such as a Gaussian process regression, which is described in U.S. patent application Ser. No. 17/181,379, filed on Feb. 22, 2021, which is incorporated by reference herein in its entirety.

Figure 2:
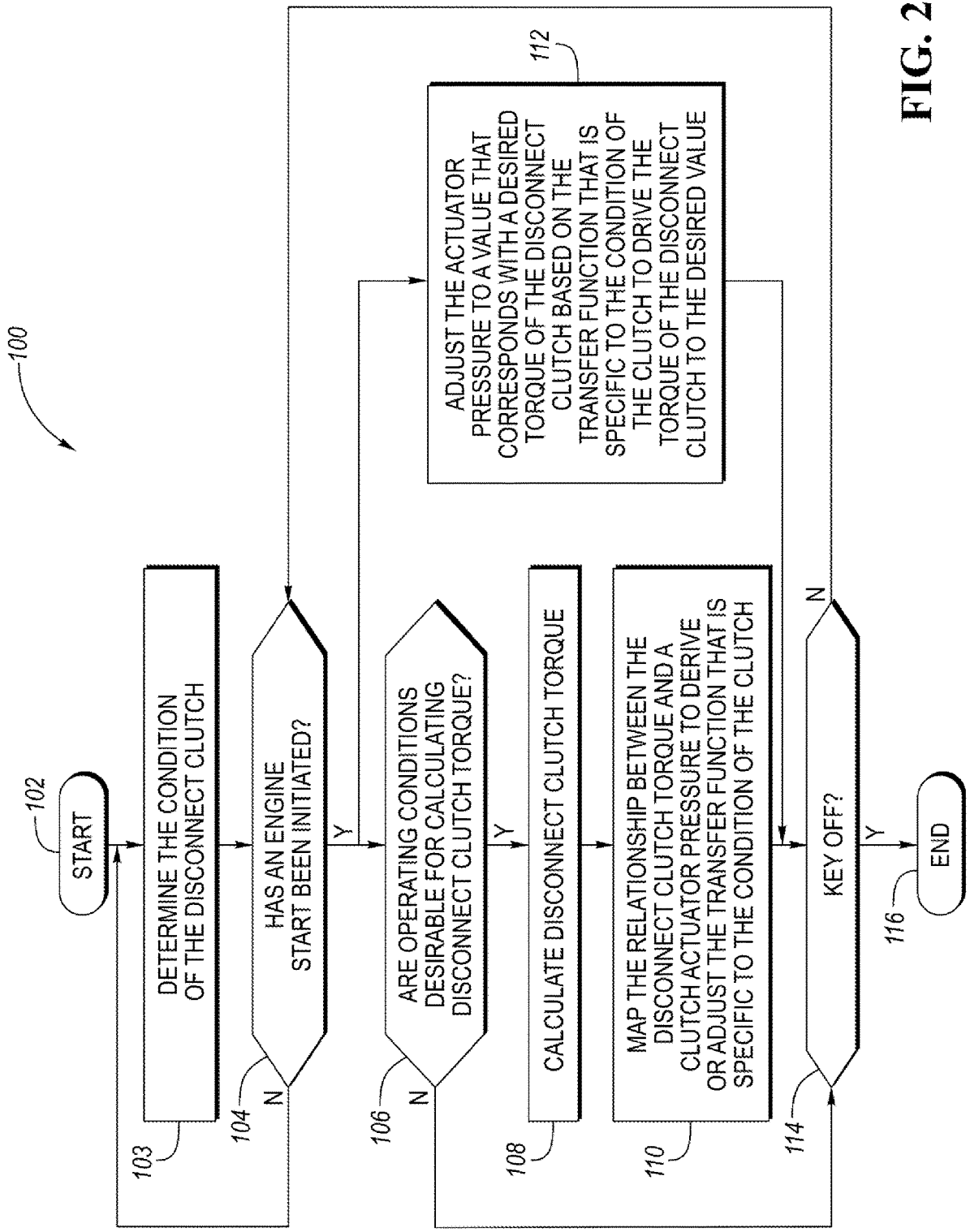
FIG. 2 is a flowchart illustrating a method of controlling the torque of the disconnect clutch.

Referring to FIG. 2, a flowchart of a method 100 of controlling the torque of the disconnect clutch 26 is illustrated. The method 100 may be stored as control logic and/or an algorithm within the controller 50 or in cloud computing storage. The controller 50 may implement the method 100 by controlling the various components of the vehicle 10. The method 100 begins at start block 102. Start block 102 may correspond to an engagement of a vehicle ignition or a "key on" condition that indicates an operator initiating a new drive cycle for operating the vehicle.

The method 100 then moves on to block 103 where the slipping condition $SC_j$ (j=1, 2, ...) of the disconnect clutch 26 prior to engagement of the disconnect clutch 26 to start the engine 14 is determined. The slipping condition may be observed via speed sensors that measure a speed differential between on opposing side of the disconnect clutch 26. The slipping condition may correspond to a hydrodynamic lubrication condition, a boundary lubrication condition, or a mixed lubrication condition. The slipping condition may be inferred or derived from (1) a time period or duration the disconnect clutch 26 is in a slipping state after a previous shutdown of the engine 14 upon receiving the command to start the engine 14 (e.g., a time period the disconnect clutch 26 had a slip speed that was above a non-zero threshold value after a previous shutdown of the engine 14), (2) a time period or duration that the engine 14 has been shut down after an immediately previous shutdown of the engine 14 upon receiving the command to start the engine 14, (3) a time period or duration that the engine 14 was in a zero-speed or near zero speed state (e.g., 10 rpms or less) upon receiving a command to start the engine 14, or (4) a period of time or time duration that the speed of the engine 14 was below a threshold value upon receiving a command to start the engine 14 after a previous engine shutdown. It should be noted that the step in block 103 may occur simultaneously with initiating an engine start according to block 104 (discussed below).

The time period or duration (correspond to the time period the disconnect clutch 26 being in a slipping state, the time period the engine 14 has been shut down, the time period the engine 14 was in the zero-speed or near zero speed state, or the time period the engine speed was below a threshold value after a previous engine shutdown) being less than a first threshold may correspond to a first slipping condition $SC_1$ of the disconnect clutch 26. The time period or duration being greater than a second threshold may correspond to a second slipping condition $SC_2$ of the disconnect clutch 26. The time period or duration being less than a third threshold may correspond to a third slipping condition $SC_3$ of the disconnect clutch 26. The second threshold may be greater than first threshold, and the third threshold may be greater than the first threshold but less than the second threshold.

The first slipping condition $SC_1$ and the third slipping condition $SC_3$ of the disconnect clutch 26 may each correspond to mixed lubrication conditions that are significantly different such that different transfer functions may be warranted to control the disconnect clutch. For example, the first slipping condition $SC_1$ may be a mixed lubrication that is closer to a full boundary lubrication condition of the disconnect clutch 26 relative to the third slipping condition $SC_3$, and the third slipping condition $SC_3$ may be a mixed lubrication that is closer to a full hydrodynamic lubrication condition of the disconnect clutch 26 relative to the first slipping condition $SC_1$. The second slipping condition $SC_2$ of the disconnect clutch 26 may correspond to hydrodynamic lubrication condition. Alternatively, the first slipping condition $SC_1$ of the disconnect clutch 26 may correspond to a full boundary lubrication condition.

It should be understood that additional slipping conditions $SC_4 \ldots SC_j$ may be included that are defined by time thresholds before the first slipping condition $SC_1$ of the disconnect clutch 26, after the third slipping condition $SC_3$ of the disconnect clutch 26, or between any of the first, second, and third conditions $SC_1$, $SC_2$, $SC_3$ of the disconnect clutch 26. Each slipping condition $SC_1 \ldots SC_j$, will require that a different transfer function is used to derive, adjust, and control the disconnect clutch 26 during an engine start as discussed immediately below.

The method 100 then moves on to block 104, where it is determined if an engine start has been initiated. More specifically, the step at block 104 may determine if an engine start or restart has been initiated where the disconnect clutch 26 is or will be utilized to start the engine 14. If an engine start or restart has not been initiated, the method 100 recycles back to the beginning of block 103. If an engine start or restart has been initiated, the method 100 moves on to block 106 where it is determined if the operating or driving conditions of the vehicle are desirable for calculating the torque of the disconnect clutch during the engine start or restart. The operating or driving conditions of the vehicle are desirable for calculating the torque of the disconnect clutch when the specific conditions that are assumed by the engine disconnect clutch torque calculation equation (i.e., equation 1 listed below) are present during the engine start or restart. For example, the engine disconnect clutch torque may be calculated during engine start or restart events during desired operating or driving conditions that include the transmission (e.g., gearbox 24) experiencing no gear shifting, no (i.e., zero) vehicle braking, and the steering angle being less than a pre-determined threshold (e.g., the steering angle is less than 10°).

If the operating or driving conditions of the vehicle are desirable for calculating the torque of the disconnect clutch during the engine start or restart, the method moves on to block 108. At block 108, the toque of the disconnect clutch is calculated according to equations (1) and (2):

$$T_{K0} = T_{Mtr} - (I_{Mtr} + I_{impeller})\alpha_{Mtr} + (TR-1)(\omega_{mtr}/K)^2 - \frac{T_D + I_{out}\alpha_{out}}{\eta \cdot GR} \quad (1)$$

$$T_D = k_1 + k_2 a_{imu} + k_3 v + k_4 v^2 \quad (2)$$

where $T_{K0}$ is the torque of the disconnect clutch 26, $T_{Mtr}$ is the estimated torque of the M/G 18, $I_{Mtr}$ is the inertia of the M/G 18, $I_{impeller}$ is the inertia of the torque converter impeller 29, $a_{Mtr}$ is angular acceleration of the M/G 18, TR is the torque ratio of the torque converter 22, $\omega_{mtr}$ is the angular speed of the M/G 18, K is the K factor of the torque converter 22, $T_D$ is the torque at the output of the transmission gearbox 24 (i.e., the torque of output shaft 36), $I_{out}$ is the lumped inertia of the transmission (i.e., the lumped inertia of the torque converter 22 and the gearbox 24), $\alpha_{out}$ is the angular acceleration of the transmission output shaft 36, $\eta$ is the efficiency of the gearbox 24, GR is the gear ratio of the transmission at the time of engine restart (i.e., the gear ratio of gearbox 24), v is linear velocity of the vehicle, $a_{imu}$ is the IMU signal, and $k_1$, $k_2$, $k_3$, and $k_4$ are the mapping coefficients. It should be noted that equation (2) and the corresponding variables and coefficients are disclosed within U.S. patent application Ser. No. 16/928,707, filed on Jul. 14, 2020, which has been incorporated by reference in its entirety.

Next, the method 100 moves on to block 110 where the relationship between the disconnect torque $T_{K0}$ and the disconnect clutch actuator pressure $P_{K0}$ are mapped (i.e., the torque values of the disconnect clutch 26 are mapped to the corresponding values of the disconnect clutch actuator pressure $P_{K0}$) to derive or adjust the transfer function that represents the relationship between the disconnect torque $T_{K0}$ and the disconnect clutch actuator pressure $P_{K0}$, and that is specific to the slipping conditions $SC_1 \ldots SC_j$ of the disconnect clutch 26 determined at block 103. More specifically at block 110, the transfer function of the specific to the slipping conditions $SC_1 \ldots SC_j$ of the disconnect clutch 26 may be generated via applying a regression fit to a collection of transfer function data sets that consist of the mapped values of the disconnect clutch torque $T_{K0}$ and the disconnect clutch actuator pressure $P_{K0}$, such as a recursive least square method, or via applying a Kalman filter to the mapped values of the disconnect clutch torque $T_{K0}$ and the disconnect clutch actuator pressure $P_{K0}$. Multiple transfer functions may be derived, adjusted, and utilized over several cycles that are specific to each of the slipping conditions $SC_1 \ldots SC_j$ of the disconnect clutch 26. The transfer functions may be linear functions, non-linear functions, linear functions with hysteresis loops, or non-linear functions with hysteresis loops. Examples of linear and non-linear equations are illustrated by equations (3) and (4), respectively:

$$T_{k0} = C^*(P_{k0} - P_{Stroke}) \tag{3}$$

$$T_{K0} = F(P_{K0}) \tag{4}$$

where $P_{Stroke}$ is the stroke pressure of the disconnect clutch actuator (i.e., the pressure required to advance the disconnect clutch 26 to an initial engagement between the opposing sides of the disconnect clutch, which may be referred to as the "kiss point") and C is a gain value of a linear transfer function. $P_{Stroke}$ may be referred to as an offset value of a linear transfer function. $F(P_{K0})$ may be a second-order polynomial function, a power function, or an exponential function. $F(P_{K0})$ may be a non-parametric function such as a neural network.

The transfer functions that are specific to the slipping conditions $SC_1 \ldots SC_j$ of the disconnect clutch 26 may experience little or no changes within days or weeks once large amounts of data is collected or if the data collected is within an allowable variance of the current values. If new data is an outlier and varies significantly from other data points, such new data may be ignored and the transfer functions would not be adjusted by such data. Furthermore, the transfer functions may have had initial values that were stored in the controller 50 after the previous occurrence that the method 100 cycled through block 110 or at the end of a previous drive cycle. If the transfer functions are updated at block 110, the new values of the transfer functions are stored within the controller 50 and may replace the previous values of the transfer functions.

The method 100 also includes block 112, where the disconnect clutch actuator pressure $P_{K0}$ is adjusted to a value that corresponds with a desired torque of disconnect torque $T_{K0}$ based on the transfer function that is specific to the slipping condition $SC_1 \ldots SC_j$ of the disconnect clutch 26 observed at block 103 in order to drive the torque of the disconnect clutch 26 to such a desired value in response to a command to control the torque of disconnect torque $T_{K0}$ to such a desired value during the engine start. It should be noted that if the transfer functions include several fitting equations that are based on specific operating conditions of the vehicle, the specific equation fit to such an operating condition of the vehicle may be applied. The step in block 112 occurs simultaneously or in parallel with steps 106, 108 and 110.

Next, the method 100 moves on to block 114 where it is determined if the vehicle ignition has been disengaged, which corresponds to a "key off" condition that indicates the operator has turned off the vehicle and has terminated the current drive cycle. If the vehicle ignition has been disengaged, the method 100 ends at block 116. If the vehicle ignition has not been disengaged, the method 100 returns to block 104, where the process repeats.

Returning to block 106, if it is determined that the operating or driving conditions of the vehicle are not desirable for calculating the torque of the disconnect clutch during the engine start or restart, the method 100 moves directly on to 114. It should be noted that if the answer is "NO" at block 106 and if there is a command to adjust the torque of the disconnect clutch $T_{K0}$ to a desired value, an unadjusted transfer function that is stored from a previous drive cycle or from a previous cycle of the method through block 110 may be applied to control the disconnect clutch actuator pressure $P_{K0}$ in order drive the torque of the disconnect clutch $T_{K0}$ to such a desired value. It should be understood that the flowchart in FIG. 2 is for illustrative purposes only and that the method 100 should not be construed as limited to the flowchart in FIG. 2. Some of the steps of the method 100 may be rearranged while others may be omitted entirely.

Figure 3:
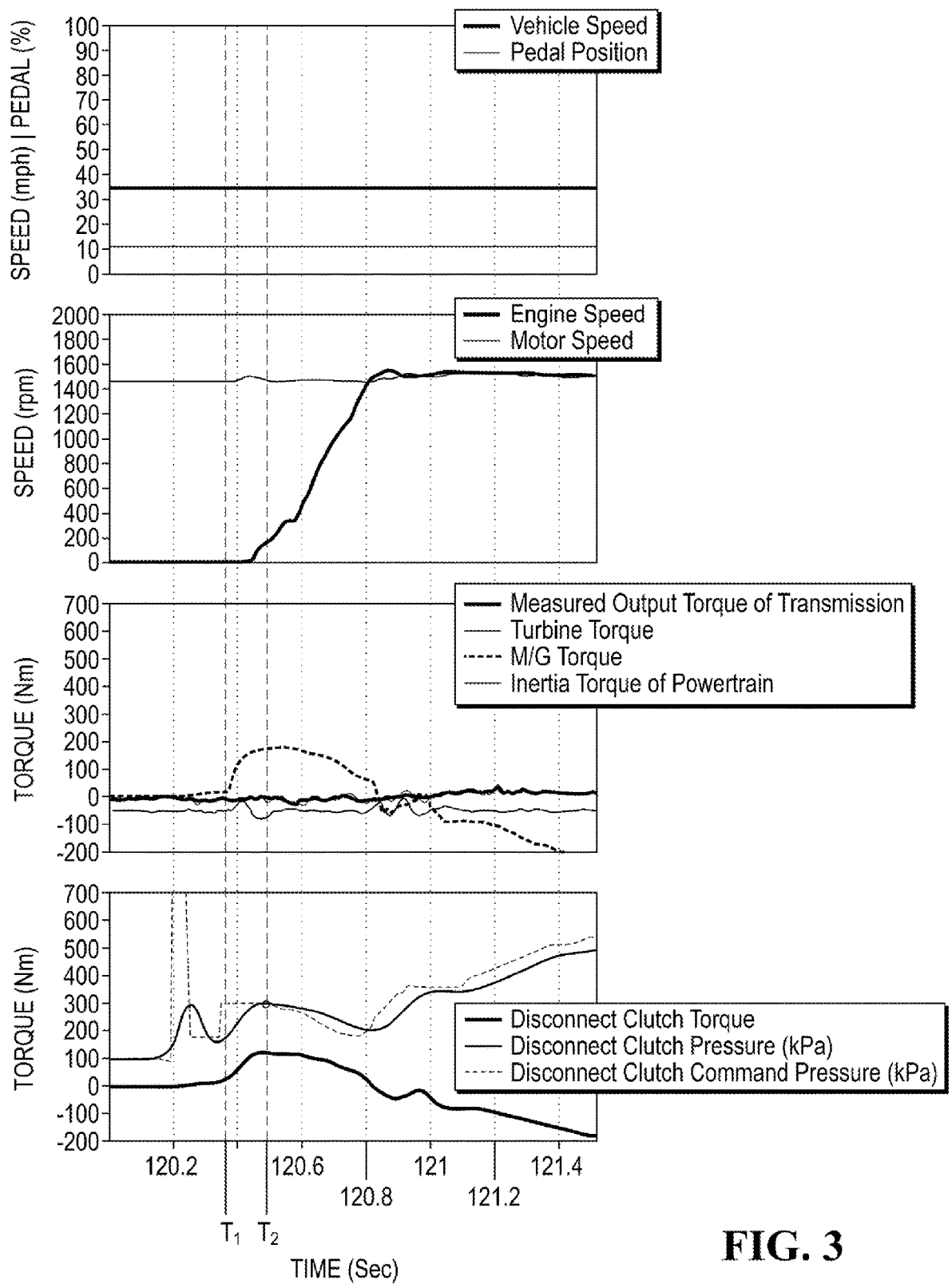
FIG. 3 is a series graphs representing a series of parameters of the powertrain during a normal engine start.

Referring to FIG. 3, a series of parameters of the powertrain 12 are illustrated during a normal engine start (i.e., an engine start where the engine 14 has been shut down for a sufficient amount of time that the disconnect clutch 26 is not transferring torque and is in a full hydrodynamic lubrication state). During initial cranking at time $t_1$, an actual or measured torque of the disconnect clutch 26 is based on a hydrodynamic lubrication operating state of the disconnect clutch 26. During bump-off (i.e. the second stage of an engine start where the actuator pressure of the disconnect clutch 26 begins to drop at time $t_2$), the clutch torque is based on a boundary lubrication operating state of the disconnect clutch 26. Since the torque of the disconnect clutch 26 may vary significantly during a normal engine start, an appropriated transfer function to control the torque disconnect clutch 26 during a normal engine start is desired. Such a transfer function for controlling the torque disconnect clutch 26 during a normal engine start illustrated in FIG. 5 (i.e., the transfer function formed by the calculated data points), which has an appropriate hysteresis to compensate for the disconnect clutch 26 operating in the hydrodynamic, mixed hydrodynamic-boundary, and boundary lubrication states.

Figure 4:
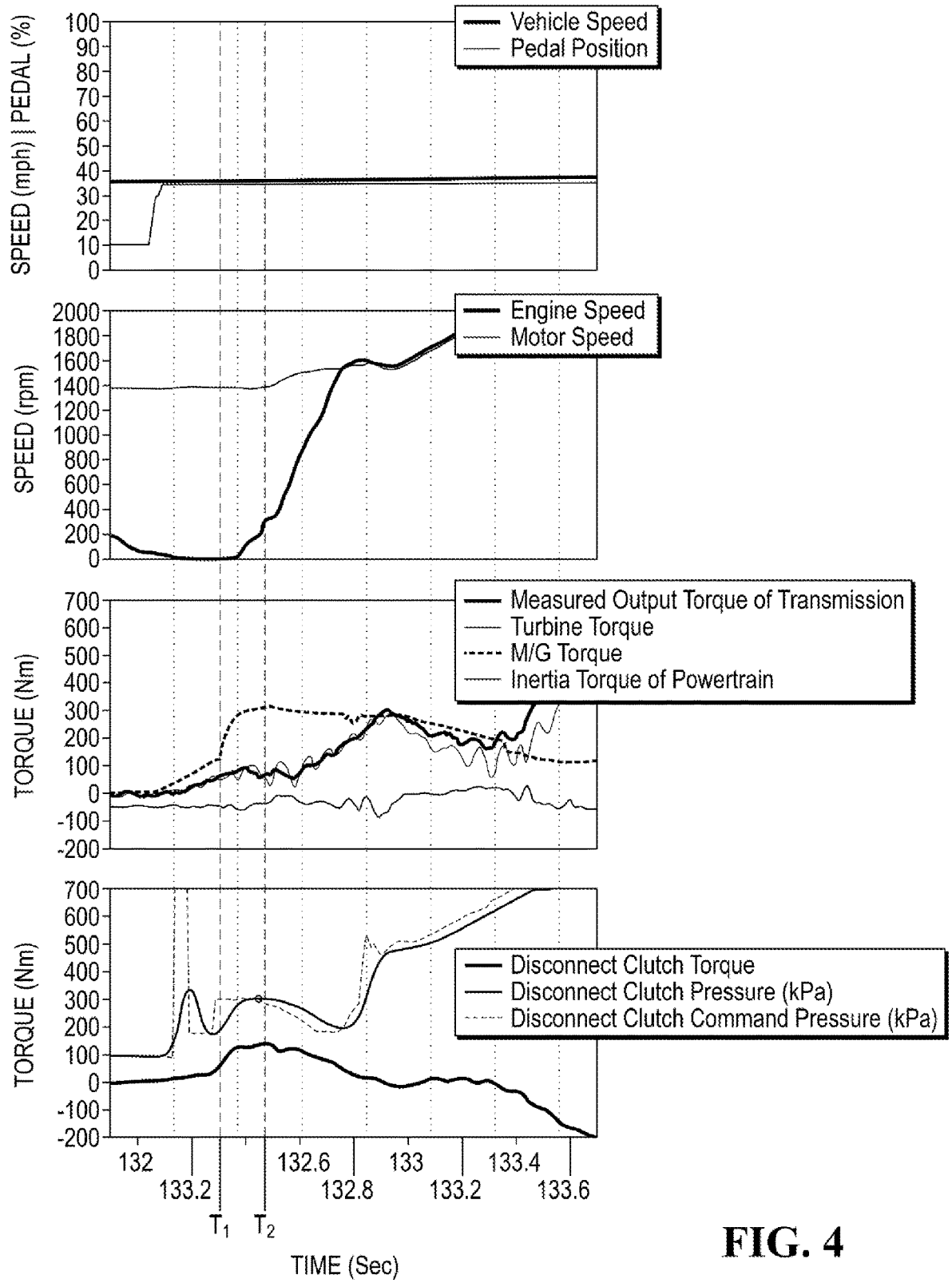
FIG. 4 is a series graphs representing the series of parameters of the powertrain during a change of mind engine start.

Referring to FIG. 4, the series of parameters of the powertrain 12 are illustrated during a change of mind engine start (i.e., an engine start where the engine 14 is being restarted immediately or soon after the engine 14 was shutdown or while the engine 14 is still in the process of being shutdown). During a change of mind engine start, the disconnect clutch 26 is not in the state of full hydrodynamic lubrication but is operating in either a boundary lubrication or a mixed lubrication state. Accordingly, the torque of the disconnect clutch 26 relative to the pressure of the actuator of the disconnect clutch 26 is higher than during a normal engine start scenario (described with respect to FIG. 3) for both initial cranking at time $t_1$ and bump-off at time $t_2$. Furthermore, the torque of the disconnect clutch 26 exhibits no hysteresis because there is no transition between hydrodynamic and boundary lubrication states. Since the torque of the disconnect clutch 26 exhibits little or no hysteresis, an appropriated transfer function to control the torque disconnect clutch 26 during a change of mind engine start that is different from the transfer function for controlling the torque disconnect clutch 26 during a normal engine start is desired. Such a transfer function for controlling the torque of the disconnect clutch 26 during a change of mind engine start is illustrated in FIG. 6 (i.e., the transfer function formed by the calculated data points), which has little or no hysteresis since there is little or no transition between hydrodynamic, mixed hydrodynamic-boundary, and boundary lubrication states.

Figure 5:
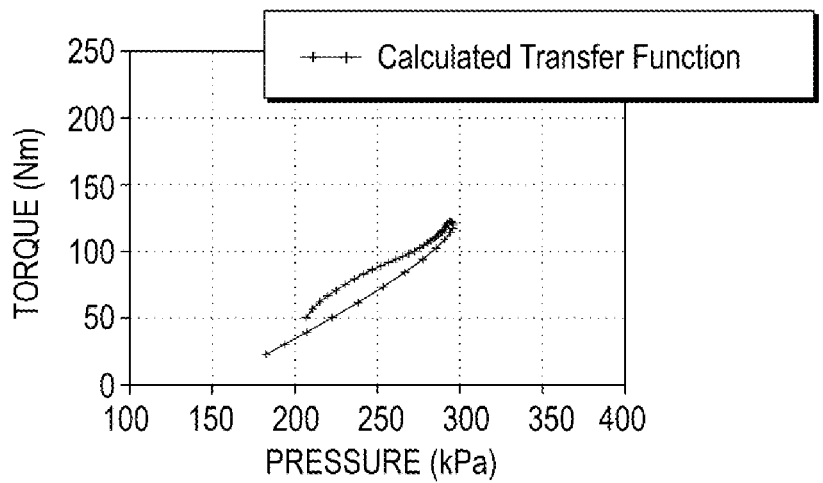
FIGS. 5-7 illustrate three different transfer functions that may be used to control the disconnect clutch during an engine restart according to the method in FIG. 2.
Figure 6:
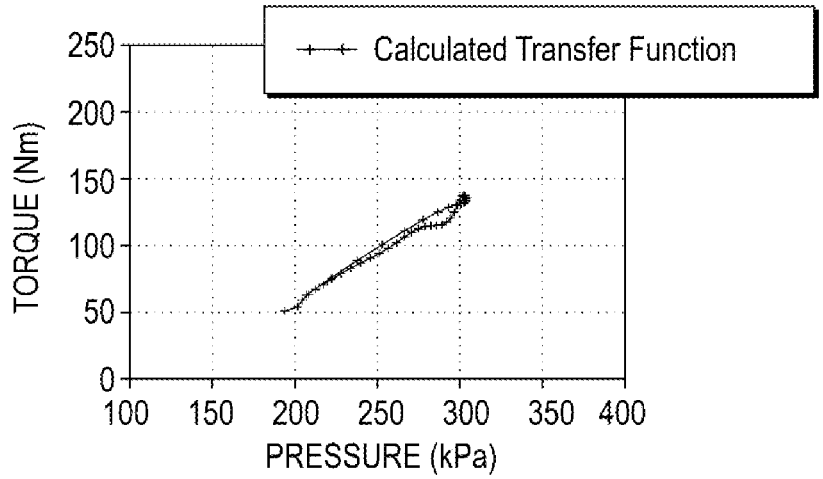
Figure 7:
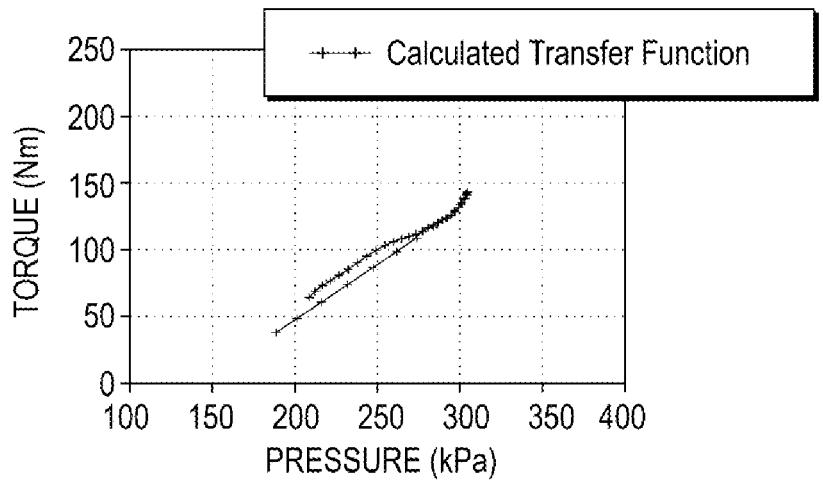

FIGS. 5-7 illustrate three different transfer functions that may be used to control the disconnect clutch 26 during an engine start or restart. Each transfer function may be updated according to method 100 above. The three different transfer functions in FIGS. 5-7 are just examples of transfer functions and it should be understood that more than three transfer functions may be utilized. Each transfer function corresponds to a specific slipping conditions $SC_1 \ldots SC_j$ of the disconnect clutch 26. As previously stated, the transfer function in FIG. 5 corresponds to a transfer function utilized during a normal engine start and the transfer function in FIG. 6 corresponds to a transfer function utilized during a change of mind engine start. The transfer function formed by the calculated data points in FIG. 7 falls in between the transfer functions of FIGS. 5 and 6. More specifically, the transfer function in FIG. 7 represents a transfer function used in response to a change of mind engine start. However, the time period after the previous engine shutdown is longer than what was experienced in the change of mind engine scenario in FIG. 4 but shorter than the extended shutdown period experienced in the normal engine start scenario of FIG. 3. Therefore, in FIG. 7, there is a mixed lubrication state that includes more boundary lubrication than experienced under the condition in which the transfer function of FIG. 5 is utilized and that includes more hydrodynamic lubrication than experienced under the condition in which the transfer function of FIG. 6 is utilized. For these reasons, the torque values experienced by the disconnect clutch relative to the disconnect actuator pressure in FIG. 7 will experience some hysteresis, but less than the hysteresis experienced during the normal engine start of FIG. 5.

Each of the transfer functions in FIGS. 5-7 are representative of transfer functions that correspond to one of the specific slipping conditions $SC_1 \ldots SC_j$ of the disconnect clutch 26. Each of the transfer functions will be utilized to control the disconnect clutch 26 and will be adjusted according to the method 100 above when the specific slipping conditions $SC_1 \ldots SC_j$ of the disconnect clutch 26 that correspond to the specific transfer function is detected prior to engagement of the disconnect clutch 26 to start the engine 14.

The transfer function formed by the calculated data points in FIG. 6 may correspond to a first slipping condition where a specific time parameter is below a first threshold, the transfer function formed by the calculated data points in FIG. 6 may correspond to a second slipping condition where the specific time parameter is greater a second threshold, and the transfer function formed by the calculated data points in FIG. 7 may correspond to a third slipping condition where the specific time parameter is below a third threshold, where the second threshold is greater than the first threshold, and where the third threshold is greater than the first threshold but less than the second threshold. The specific time parameter may correspond to: (1) a time period or duration the disconnect clutch 26 is in a slipping state after previous shutdown of the engine 14 upon receiving the command to start the engine 14; (2) a time period or duration that the engine 14 has been shut down after an immediately previous shutdown of the engine 14 upon receiving the command to start the engine 14; (3) a time period or duration that the engine 14 was in a zero-speed or near zero speed state (e.g., 10 rpms or less) upon receiving the command to start the engine 14; or (4) a period of time or time duration that the speed of the engine 14 was below a threshold value upon receiving the command to start the engine 14.

It should be understood that transfer functions in additional to the three transfer functions depicted in FIGS. 5-7 may be adopted for slipping conditions that are in addition to three slipping conditions (i.e., transfer function may be derived, adjusted, and utilized to control the disconnect 26 for each slipping condition $SC_4 \ldots SC_j$ of the disconnect clutch 26 according to the method 100 above). The transfer functions may be developed based on time thresholds for any of the specific time parameters described above, where the time thresholds may be less than the first threshold, greater than the second threshold, or may fall in between the first, second, or third thresholds for the time parameters.

It should be understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a transmission having an input and an output,
   an engine configured to generate and deliver torque to the input,
   an electric machine configured to generate and deliver torque to the input, and
   a disconnect clutch configured to connect and disconnect the engine from the input, and to crank the engine during an engine start;
   an inertial measurement unit configured to measure inertial forces exerted onto the vehicle; and
   a controller programmed to,
      in response to a demanded torque at the output, control the torque at the output based on a mapped relationship from the inertial forces and a vehicle velocity,
      in response to a command to start the engine via the disconnect clutch and a first slipping condition of the disconnect clutch, close the disconnect clutch, calculate the torque of the disconnect clutch based on the controlled torque at the output and an electric machine torque, and map the relationship between the torque of the disconnect clutch and a clutch actuator pressure to derive or adjust a first transfer function that represents the relationship between the torque of the disconnect clutch and the clutch actuator pressure under the first slipping condition, and
      in response to a command to adjust the torque of the disconnect clutch to a first desired value during a first engine start and the first slipping condition of the disconnect clutch, adjust the clutch actuator pressure to a first value that corresponds to the first desired value according to the first transfer function.

2. The vehicle of claim 1, wherein the controller is further programmed to,
   in response to the command to start the engine via the disconnect clutch and a second slipping condition of the disconnect clutch, close the disconnect clutch, calculate the torque of the disconnect clutch based on the controlled torque at the output and an electric machine torque, and map the relationship between the torque of the disconnect clutch and the clutch actuator pressure to derive or adjust a second transfer function that represents the relationship between the torque of the disconnect clutch and the clutch actuator pressure under the first slipping condition, and in response to a command to adjust the torque of the disconnect clutch to a second desired value during a second engine start and the second slipping condition of the disconnect clutch, adjust the clutch actuator pressure to a second value that corresponds to the second desired value according to the second transfer function.

3. The vehicle of claim 2, wherein the first slipping condition corresponds to a slipping time duration of the disconnect clutch being less than a first threshold after a previous engine shutdown.

4. The vehicle of claim 3, wherein the second slipping condition corresponds to the slipping time duration of the disconnect clutch being greater than a second threshold after the previous engine shutdown.

5. The vehicle of claim 4, wherein the controller is further programmed to, in response to the command to start the engine via the disconnect clutch and a third slipping condition of the disconnect clutch, close the disconnect clutch, calculate the torque of the disconnect clutch based on the controlled torque at the output and an electric machine torque, and map the relationship between the torque of the disconnect clutch and the clutch actuator pressure to derive or adjust a third transfer function that represents the relationship between the torque of the disconnect clutch and the clutch actuator pressure under the first slipping condition, and in response to a command to adjust the torque of the disconnect clutch to a third desired value during a third engine start and the third slipping condition of the disconnect clutch, adjust the clutch actuator pressure to a third value that corresponds to the third desired value according to the third transfer function.

6. The vehicle of claim 5, wherein the third slipping condition corresponds to the slipping time duration of the disconnect clutch being greater than the first threshold and less than the second threshold after the previous engine shutdown.

7. A vehicle comprising:
a transmission having an input;
an engine configured to generate and deliver torque to the input;
a clutch configured to connect and disconnect the engine from the input, and to crank the engine during an engine start; and
a controller programmed to,
in response to a command to adjust a torque of the clutch during an engine start and a presence of a hydrodynamic lubrication condition of the clutch, drive a clutch actuator pressure to a first desired value, and
in response to a command to adjust the torque of the clutch during the engine start and a presence of a mixed lubrication condition of the clutch, drive the clutch actuator pressure to a second desired value that is greater than the first desired value.

8. The vehicle of claim 7, wherein the controller is further programmed to, in response to a command to adjust a torque of the clutch during the engine start and a presence of a mixed lubrication condition of the clutch, drive a clutch actuator pressure to a third desired value.

9. A vehicle comprising:
a powertrain having,
a transmission having an input shaft and an output shaft,
an engine configured to generate and deliver torque to the input shaft, and
a disconnect clutch configured to connect and disconnect the engine from the input shaft, and to crank the engine during an engine start; and
a controller programmed to,
in response to a command to start the engine via the disconnect clutch and a first condition of the powertrain, close the disconnect clutch, calculate the torque of the disconnect clutch based on a controlled torque at the output shaft, and map the relationship between the torque of the disconnect clutch and a clutch actuator pressure to adjust a first transfer function that represents the relationship between the torque of the disconnect clutch and the clutch actuator pressure, and
in response to a command to control the torque of the disconnect clutch during a first engine start and the first condition, adjust the clutch actuator pressure according to the first transfer function to control the torque of the disconnect clutch.

10. The vehicle of claim 9, wherein the controller is further programmed to,
in response to the command to start the engine via the disconnect clutch and a second condition of the powertrain, close the disconnect clutch, calculate the torque of the disconnect clutch based on the controlled torque at the output shaft, and map the relationship between the torque of the disconnect clutch and the clutch actuator pressure to adjust a second transfer function that represents the relationship between the torque of the disconnect clutch and the clutch actuator pressure, and
in response to a command to control the torque of the disconnect clutch during a second engine start and the second condition, adjust the clutch actuator pressure according to the second transfer function to control the torque of the disconnect clutch.

11. The vehicle of claim 10, wherein the first condition corresponds to a slipping time duration of the disconnect clutch being less than a first threshold after a previous engine shutdown.

12. The vehicle of claim 11, wherein the second condition corresponds to the slipping time duration of the disconnect clutch being greater than a second threshold after the previous engine shutdown.

13. The vehicle of claim 10, wherein the first condition corresponds to a time duration of a previous engine shutdown being less than a first threshold.

14. The vehicle of claim 13, wherein the second condition corresponds to the time duration of the previous engine shutdown being greater than a second threshold.

15. The vehicle of claim 10, wherein the first condition corresponds to a time duration of a zero-speed engine state being less than a first threshold after a previous engine shutdown.

16. The vehicle of claim 15, wherein the second condition corresponds to the time duration of the zero-speed engine state being greater than a second threshold after the previous engine shutdown.

17. The vehicle of claim 10, wherein the controller is further programmed to, in response to the command to start the engine via the disconnect clutch and a third condition of the powertrain, close the disconnect clutch, calculate the torque of the disconnect clutch based on the controlled torque at the output shaft, and map the relationship between the torque of the disconnect clutch and the clutch actuator pressure to adjust a third transfer function that represents the relationship between the torque of the disconnect clutch and the clutch actuator pressure, and in response to a command to control the torque of the disconnect clutch during a third engine start and the third condition, adjust the clutch actuator pressure according to the third transfer function to control the torque of the disconnect clutch.

18. The vehicle of claim 17, wherein the first condition corresponds to a slipping time duration of the disconnect clutch being less than a first threshold after a previous engine shutdown, the second condition corresponds to the slipping time duration of the disconnect clutch being greater than a second threshold after the previous engine shutdown, and the third condition correspond to the slipping time duration being greater than the first threshold and less than the second threshold after the previous engine shutdown.

19. The vehicle of claim 17, wherein the first condition corresponds to a time duration of a previous engine shutdown being less than a first threshold, the second condition corresponds to the time duration of the previous engine shutdown being greater than a second threshold, and the third condition corresponds to the time duration of the previous engine shutdown being greater than the first threshold and less than the second threshold.

20. The vehicle of claim 17, wherein the first condition corresponds to a time duration of a zero-speed engine state being less than a first threshold after a previous engine shutdown, the second condition corresponds to the time duration of the zero-speed engine state being greater than a second threshold after the previous engine shutdown, and the third condition corresponds to the time duration of the zero-speed engine state being greater than a first threshold and less than a second threshold after the previous engine shutdown.

* * * * *